United States Patent Office 2,813,005
Patented Nov. 12, 1957

2,813,005

PROCESS OF PRODUCING ALKALI METAL FLUOTITANATES IN WHICH THE TITANIUM HAS A VALENCE OF AT LEAST TWO AND NOT GREATER THAN THREE

Anthony J. Kolk, Jr., South Euclid, and Merle E. Sibert, Euclid, Ohio, assignors, by mesne assignments, to Horizons Titanium Corporation, Princeton, N. J., a corporation of New Jersey No Drawing. Application December 21, 1955,
Serial No. 554,400

10 Claims. (Cl. 23—51)

This invention relates to the production of complex salts of titanium in which the titanium has a valence less than four. More particularly, it has been discovered that complex alkali metal salts of titanium and fluorine may be prepared in which the titanium is trivalent or divalent and that such salts are characterized by a high degree of stability. Their preparation comprises reacting a complex alkali metal salt of titanium and fluorine, for instance potassium fluotitanate, with titanium nitride under carefully controlled conditions to produce the complex alkali metal (e. g. potassium) salt of titanium trifluoride or a mixture of the complex salt of titanium trifluoride and titanium difluoride, or either of the foregoing dissolved in a suitable fused salt.

The complex products formed are quite stable and may be handled with a minimum of precautions. They are useful in the preparation of titanium metal, for example, by electrolysis as described in the Morris A. Steinberg and Alfred A. Topinka application, Serial No. 262,886, filed December 21, 1951, in which instance they may constitute the entire salt bath to be electrolyzed or only a portion thereof; or in the field of ceramics or as catalysts, or they may find further utility in other diverse applications.

Various methods for the preparation of the fluorides of titanium have been described in the literature. Three general approaches have been tried as follows: (1) direct fluorination of titanium metal with either elemental fluorine or anhydrous hydrofluoric acid; (2) reduction of fluortitanates by hydrogen; and (3) solution of titanium dioxide in aqueous hydrofluoric acid. In each of these methods, the processes are unattractive because of one or more of the following factors: (1) the high cost of raw materials; (2) the need for complicated apparatus fabricated from special materials resistant to corrosive attack by fluorine or fluorine acids; (3) the complex operational techniques required, and (4) the instability of the prior art products which makes necessary particular care in their handling. (For example, both titanium tetrafluoride and titanium trifluoride are extremely hygroscopic and cannot be exposed to the atmosphere since they react with water and hydrolyze to form hydrofluoric acid and titanium dioxide.)

By means of the method herein described, each of the disadvantages of the prior art processes is overcome. The two raw materials employed—alkali metal fluotitanate and titanium nitride—are both relatively inexpensive and may be obtained commercially as substantially pure substances. If desired, either or both of these materials may easily be prepared by techniques known in the art, starting with known titanium containing materials. For instance, the fluotitanate may be prepared as described in U. S. Patent 2,475,287 and the nitride may be prepared as described in Barksdale's "Titanium."

The apparatus required for the preparation of the lower fluorides of titanium need not be complex. A reactor made of an appropriate inert material and provided with means for heating to maintain any desired temperature in the range 700° C.–1300° C., with means for rapidly cooling the reactor, and with means for producing any desired atmosphere including a vacuum in the reactor suffices. The technique is simple and involves merely the weighing of the reactants, charging these reactants into a graphite crucible, placing the crucible in the reactor, sealing the unit by bolting a gasketed steel head in place, pumping out the air with a vacuum pump and replacing the air with an inert gas such as pure argon. The reactor is then heated to the desired temperature while argon is flowed continuously through the unit. After completion of the heating period, the reactor is rapidly cooled and the reaction product removed. The product is either the complex salt of titanium trifluoride or a mixture of the complex salts of titanium trifluoride and titanium difluoride according to the reaction conditions.

Which of the several possible products is obtained by the method of the invention appears to be largely a function of the temperature at which the reaction is carried out as may be seen from the following reactions: At temperatures between about 780° C. and 900° C. the reaction of one mol of titanium nitride with three mols of potassium fluotitanate produces the complex potassium salt of titanium trifluoride and nitrogen. At higher temperatures, e. g. 900° C. to 1050° C. and up to 1200° C., one mol of titanium nitride reacts with two mols of potassium fluotitanate to produce nitrogen and a mixture of the complex potassium salts of titanium trifluoride and titanium difluoride. Each of the above reactions proceeds virtually to completion and hence substantially quantitative yields may be obtained without waste of raw materials.

As previously noted, the raw materials are relatively inexpensive and are obtainable in a highly pure state. Potassium fluotitanate containing less than .01% water and less than .01% of insolubles is readily available commercially. A typical titanium nitride may contain 0.05% oxygen, 0.05% hydrogen and 22.4% nitrogen.

The following examples are illustrative of the practice of this invention:

*Example I*

A graphite crucible was loaded with anhydrous recrystallized potassium fluotitanate ($K_2TiF_6$) and finely divided (—100 mesh Tyler Standard) titanium nitride (TiN) in the proportions of three mols of the fluotitanate to one mol of the nitride. The loaded crucible was placed in a suitable reactor and the unit was sealed by bolting on the gasketed steel head. The air was pumped out by means of a laboratory vacuum pump and replaced with pure argon gas. The charge was heated to 850° C. and maintained at that temperature for 8 hours while 2 and 3 liters per minute of pure argon gas were flowed through the reactor. At the completion of the heating period the unit was rapidly cooled to room temperature in a pure argon atmosphere and the reaction product was removed from the unit. The product was found to be a dark black colored salt cake. The salt cake was pulverized and a representative sample was analyzed for total titanium. The black product analyzed (gravimetric), 24.9% titanium. Since this example corresponds to the conditions conductive to the formation of the trivalent fluotitanate where in the theoretical product would contain 25% titanium, the reaction has gone 99.5% to completion for the formation of this complex potassium salt of titanium trifluoride.

A quantitative value for the concentration of trivalent titanium in the above product was obtained by dissolving a weighed sample of the salt in acidified potassium dichromate solution and the unreacted potassium dichromate back titrated with standardized thiosulfate solution. A salt sample weighing 1.30 grams was dissolved in a potassium dichromate solution containing 0.003 mol potassium dichromate (0.313 gram of chromium) and acidified with sulfuric acid. The solution was heated for ten minutes and then the unreacted potassium dichromate was determined by back titrating with thiosulfate solution. It was found that 0.198 gram of potassium dichromate remained after the oxidation reduction reaction between titanium trifluoride and potassium dichromate. Therefore, the weight of chromium that has been reduced by trivalent titanium ions is 0.313 minus 0.198 or 0.115 gram. Using this value of 0.115 gram of chromium in the following equation, one may calculate the weight of titanium trifluoride in the original salt sample:

$$6TiF_3 + K_2Cr_2O_7 \rightarrow 6Ti^{+4} + 2Cr^{+3}$$

The value obtained was 0.318 gram of titanium trifluoride in the original salt sample. If the thermal reaction between potassium fluotitanate and titanium nitride had gone to completion then from the equation one can calculate a theoretical value of 0.325 gram of titanium trifluoride in the above 1.30 gram salt sample. Since we have obtained a value of 0.318 gram of titanium trifluoride then the original thermal reaction went to 97.9% of completion based on the oxidation-reduction reaction with potassium dichromate. This value checks quite well with the 99.5% of completion value derived from the chemical analysis or total titanium concentration of the thermal product salt.

*Example II*

Example I was repeated using a charge in which the molar proportion of recrystallized anhydrous potassium fluotitanate to powdered titanium nitride was changed from 3:1 to 2:1. The procedure of Example I was followed except that the reaction was conducted at 950° C. for 8 hours. The recovered product was very deep reddish-purple. Chemical analysis showed that the deep reddish-purple cake contained 27.1% titanium. Since the proportions and temperature correspond to those for the production of the mixed fluotitanate, this would indicate 99.5% completion of the reaction when compared with a theoretical titanium content of 27.2% in the product if complete reaction takes place. The existance of the difluoride is evidenced by the evolution of hydrogen when the deep reddish-purple product is added to water and by the amount of reduction of potassium dichromate. By a titration similar to that described in Example I, it was computed that the thermal reaction of Example II proceeded to 98.5% of completion which value checks with the 99.5% derived from chemical analysis.

In a further modification of our invention, instead of preparing the compounds of titanium with an alkali metal and fluorine, in which the titanium is trivalent, or admixtures of trivalent and divalent, we have found it possible to prepare such compounds in situ in a fused salt environment from which the nitrogen formed is rapidly eliminated and in which the complex compounds of titanium are dissolved or complexed to form compositions which are admirably suited to electrolysis, in the fused state, to produce metallic titanium.

The fused salts in which the desired reaction between a titanium nitride and a double fluoride of titanium and an alkali metal, in which the titanium is tetravalent comprise one or more alkali metal halides or alkaline earth metal halides. Because they are available in sufficient purity and at low cost, the alkali metal chlorides are preferred, particularly the chorides of sodium, potassium and lithium. Mixtures of two or more halides may be used, particularly mixtures which form low melting eutectics.

The following examples will illustrate this feature of our invention:

*Example III*

The procedure of Examples I and II was repeated with charges consisting of pure recrystallized potassium fluotitanate and finely divided nitride in the proportions previously stated. Instead of carrying out the reaction to produce the complex fluorides, per se, the charges were mixed with sodium chloride to produce a final mixture with between 80 and 90% by weight of sodium chloride and between 10% and 20% by weight of the complex alkali metal-titanium fluoride in which the valence of the titanium is less than four, produced as a reaction product. The original clear melt gradually acquired a dark purplish color as lower valent titanium was produced. The bath, after cooling, was analyzed and found to contain trivalent or trivalent and divalent titanium, respectively, when the proportions of $K_2TiF_6:TiN$ were 3:1 and 2:1 in the mixture.

We claim:

1. The method of producing alkali metal fluotitanates in which the titanium has a valence of at least two and not greater than three which comprises: bringing titanium nitride into contact with an alkali metal fluotitanate in which the titanium has a valence of four, in proportions which provide between 2 and 3 mols of the fluotitanate for each mol of nitride to be reacted and maintaining the nitride and fluotitanate in an inert fluid medium and at an elevated temperature between 800° C. and about 1200° C., whereby they react to produce a product containing at least one alkali metal fluotitanate in which the titanium has a valence of at least two and not greater than three.

2. The method of claim 1 in which the titanium nitride is brought into contact with the alkali metal fluotitanates as a finely divided solid.

3. The method of claim 2, in which the titanium nitride is finer than 100 mesh (Tyler Standard).

4. The method of claim 1, in which the inert medium is a noble gas atmosphere and the nitrogen evolved as a reaction product is removed as rapidly as it forms.

5. The method of claim 1, in which the inert medium is a fused halide of the group consisting of alkali metal halides and alkaline earth metal halides.

6. The method of claim 5, in which the inert medium comprises an alkali metal chloride.

7. The method of claim 5, in which the alkali metal chloride is sodium chloride.

8. The method of producing alkali metal fluotitanates in which the titanium has a valence of at least two and not greater than three which comprises: bringing titanium nitride into contact with an alkali metal fluotitanate in which the titanium has a valence of four in the proportion of one mol of titanium nitride to three mols of alkali metal fluotitanate, and maintaining the nitride and fluotitanate in an inert fluid medium and at an elevated temperature between 800°–900° C., whereby they react to produce a product comprising: an alkali metal fluotitanate in which the titanium has a valence of three.

9. The method of producing alkali metal fluotitanates in which the titanium has a valence of at least two and not greater than three which comprises: bringing titanium nitride into contact with an alkali metal fluotitanate in which the titanium has a valence of four in the proportion of one mol of titanium nitride to two mols of alkali fluotitanate and maintaining the nitride and fluotitanate in an inert fluid medium and at an elevated temperature between 900° C. and 1200° C., whereby they react to produce a product consisting of a mixture of alkali metal fluotitanates in which the titanium has a valence of two and a valence of three.

10. The method of producing alkali metal fluotitanates in which the titanium has a valence of at least two and not greater than three which comprises: bringing titanium nitride into contact with an alkali metal fluotitanate in which the titanium has a valence of four from the group consisting of sodium, potassium and lithium fluotitanates, in proportions which provide between 2 and 3 mols of the fluotitanate for each mol of nitride to be reacted and maintaining the nitride and fluotitanate in an inert fluid medium and at an elevated temperature between about 800° C. and about 1200° C., whereby they react to produce a product containing at least one of the group of fluotitanates of sodium, potassium and lithium in which the titanium has a valence of at least two and not greater than three.

No references cited.